(12) United States Patent
Takeda

(10) Patent No.: US 11,258,124 B2
(45) Date of Patent: Feb. 22, 2022

(54) NONAQUEOUS ELECTROLYTE SECONDARY BATTERY

(71) Applicant: Panasonic Intellectual Property Management Co., Ltd., Osaka (JP)

(72) Inventor: Katsutoshi Takeda, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/464,042

(22) PCT Filed: Nov. 17, 2017

(86) PCT No.: PCT/JP2017/041410
§ 371 (c)(1),
(2) Date: May 24, 2019

(87) PCT Pub. No.: WO2018/101073
PCT Pub. Date: Jun. 7, 2018

(65) Prior Publication Data
US 2019/0386261 A1   Dec. 19, 2019

(30) Foreign Application Priority Data

Nov. 30, 2016 (JP) .............................. JP2016-232879

(51) Int. Cl.
*H01M 50/124* (2021.01)
*H01M 10/0585* (2010.01)
*H01M 50/116* (2021.01)

(52) U.S. Cl.
CPC ..... *H01M 50/124* (2021.01); *H01M 10/0585* (2013.01); *H01M 50/116* (2021.01)

(58) Field of Classification Search
None
See application file for complete search history.

(56) References Cited

U.S. PATENT DOCUMENTS

| 2009/0004557 | A1 | 1/2009 | Lasarov et al. |
| 2010/0310911 | A1 | 12/2010 | Yamamoto et al. |
| 2014/0023893 | A1* | 1/2014 | Shimizu ............... H01M 50/20 429/72 |

(Continued)

FOREIGN PATENT DOCUMENTS

| CN | 1646730 A | 7/2005 |
| CN | 101908640 A | 12/2010 |

(Continued)

OTHER PUBLICATIONS

English Translation of Search Report dated Jul. 30, 2021, issued in counterpart CN Application No. 201780071371.0. (3 pages).

*Primary Examiner* — Carmen V Lyles-Irving
(74) *Attorney, Agent, or Firm* — Westerman, Hattori, Daniels & Adrian, LLP

(57) ABSTRACT

A nonaqueous electrolyte secondary battery includes: an electrode assembly including a separator and positive and negative electrodes stacked through the separator; a covering member disposed on the outer circumferential surface of the electrode assembly; and a nonaqueous electrolyte. The covering member has a multilayer structure including a stretchable resin layer and a heat absorbing layer containing a heat absorbing material.

13 Claims, 3 Drawing Sheets

(56) References Cited

U.S. PATENT DOCUMENTS

| | | | | |
|---|---|---|---|---|
| 2014/0287295 A1* | 9/2014 | Honda | ............... | B32B 5/022 |
| | | | | 429/144 |
| 2015/0318580 A1* | 11/2015 | Fukunaga | ......... | H01M 10/058 |
| | | | | 429/163 |
| 2016/0197386 A1* | 7/2016 | Moon | ............... | H01M 50/20 |
| | | | | 429/120 |
| 2017/0040577 A1* | 2/2017 | Kim | ............... | H01M 50/116 |

FOREIGN PATENT DOCUMENTS

| JP | 2000-21386 A | 1/2000 |
|---|---|---|
| JP | 2004-363048 A | 12/2004 |
| JP | 2012-190587 A | 10/2012 |

* cited by examiner

NONAQUEOUS ELECTROLYTE SECONDARY BATTERY

TECHNICAL FIELD

The present disclosure relates to a technique for a nonaqueous electrolyte secondary battery.

BACKGROUND ART

Examples of known nonaqueous electrolyte secondary batteries include: laminate batteries in which an electrode assembly including a positive electrode, a separator, and a negative electrode is housed in an exterior member formed from a laminate sheet; and rectangular batteries in which the electrode assembly is housed in a rectangular case.

A nail penetration test is a safety evaluation test for examining the internal short circuit resistance of a battery. For example, in the nail penetration test, an electrode assembly is penetrated with a nail in the thickness direction of the electrode assembly to simulate an internal short circuit, and the degree of heat generation is checked to examine the safety of the battery. Suppressing the heat generation of the battery penetrated with the nail is important in terms of ensuring the safety of the battery.

For example, PTL 1 to PTL 3 disclose a technique for suppressing the heat generation of a battery penetrated with a nail by disposing a stretchable covering layer on the positive electrode, the negative electrode, or the separator.

CITATION LIST

Patent Literature

PTL 1: Japanese Published Unexamined Patent Application No. 2000-21386
PTL 2: Japanese Published Unexamined Patent Application No. 2004-363048
PTL 3: Japanese Published Unexamined Patent Application No. 2012-190537

SUMMARY OF INVENTION

The energy density of nonaqueous electrolyte secondary batteries is increasing, and the amount of heat generated from a high-energy density battery penetrated with a nail can be very large. Therefore, unfortunately, the covering layer may melt, and the heat generation of the battery penetrated with the nail may not foe suppressed sufficiently.

It is an object of the present disclosure to provide a nonaqueous electrolyte secondary battery in which heat generation when the battery is penetrated with a nail can be suppressed.

A nonaqueous electrolyte secondary battery according to one aspect of the present disclosure includes: an electrode assembly including a separator and positive and negative electrodes stacked through the separator; a covering member disposed on an outer circumferential surface of the electrode assembly; and a nonaqueous electrolyte. The covering member has a multilayer structure including a stretchable resin layer and a heat absorbing layer containing a heat absorbing material.

In the nonaqueous electrolyte secondary battery according to the present disclosure, heat generation when the battery is penetrated with a nail can be suppressed.

DESCRIPTION OF EMBODIMENTS

Figure 1:
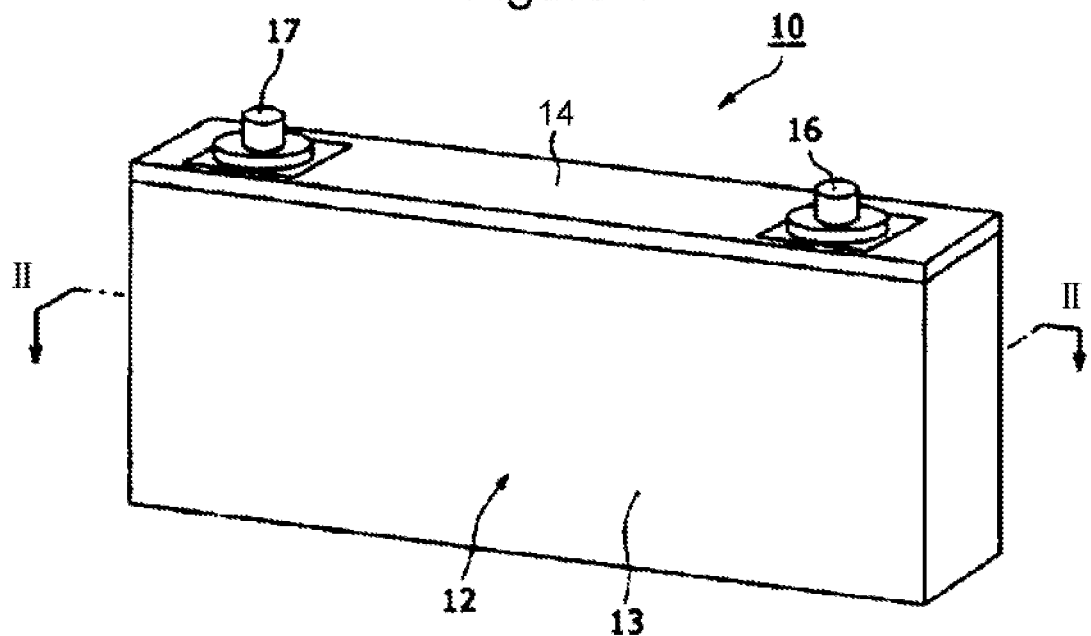
FIG. 1 is a perspective view of a nonaqueous electrolyte secondary battery in an embodiment.

An example of an embodiment will next be described in detail with reference to the accompanying drawings. The drawings referred to in the description of embodiments are schematic drawings, and the dimensional ratios etc. of components drawn in the drawings may differ from those of actual components. The phrase "substantially **" used in the present description will be described using the phrase "substantially vertical" as an example. The phrase "substantially vertical" means not only perfectly vertical but also vertical in a substantial sense.

Figure 2:
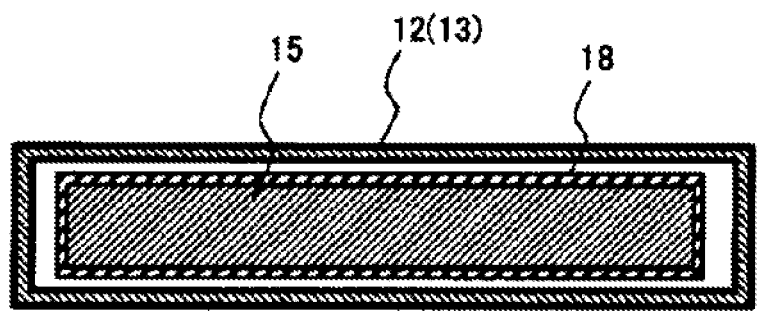
FIG. 2 is a cross-sectional view taken along line II-II in FIG. 1.

FIG. 1 is a perspective view of a nonaqueous electrolyte secondary battery in the present embodiment, and FIG. 2 is a cross-sectional view taken along line II-II in FIG. 1. The nonaqueous electrolyte secondary battery used in the present embodiment is a plate-shaped battery cell having a substantially rectangular shape in plan view and having a width smaller than the vertical and horizontal dimensions of the substantially rectangular shape.

As shown in FIGS. 1 and 2, the nonaqueous electrolyte secondary battery 10 is a rectangular battery including an electrode assembly 15, a covering member 18 disposed on the outer circumferential surface of the electrode assembly 15, and a nonaqueous electrolyte 100 that are sealed in a case 12 serving as an exterior member. The case 12 is formed by covering an upper opening of a substantially box-shaped case body 13 with a lid plate 14 serving as a sealing member. The lid plate 14 is joined to the case body 13 by, for example, welding.

The electrode assembly 15 is, for example, a stack-type electrode assembly including a plurality of positive electrodes each including a positive electrode current, collector and a positive electrode active material layer formed in a prescribed area of the positive electrode current collector and a plurality of negative electrodes each including a negative electrode current collector and a negative electrode active material layer formed in a prescribed area of the negative electrode current collector, the positive electrodes and the negative electrodes being stacked alternately with a separator therebetween. However, the electrode assembly 15 may be a wound-type electrode assembly including a positive electrode and a negative electrode that are wound with a separator therebetween.

The positive electrode current collector may be, for example, a foil of a metal such as aluminum stable in the potential range of the positive electrode or a film including the metal disposed on its surface. Preferably, the positive electrode active material layer contains, in addition to the positive electrode active material, a conductive agent and a binder and is disposed on both sides of the current collector.

The positive electrode active material used may be, for example, a lithium-containing complex oxide. Preferred examples of the complex oxide include Ni—Co—Mn-based and Ni—Co—Al-based lithium-containing complex oxides.

The negative electrode current collector may be, for example, a foil of a metal such as copper stable in the potential range of the negative electrode or a film including the metal disposed on its surface. Preferably, the negative electrode active material layer contains, in addition to the negative electrode active material, a binder and is disposed on both sides of the current collector. It is only necessary that the negative electrode active material be a material capable of occluding and releasing lithium ions, and graphite is generally used as the negative electrode active material.

For example, an ion-permeable insulating porous sheet is used for the separator. Specific examples of the porous sheet include microporous thin films, woven fabrics, and nonwoven fabrics. Preferred examples of the material of the separator include olefin-based resins such as polyethylene and polypropylene and cellulose.

The nonaqueous electrolyte contains a nonaqueous solvent and an electrolyte salt dissolved in the nonaqueous solvent. The nonaqueous electrolyte is not limited to a liquid electrolyte and may be a solid electrolyte using, for example, a gel polymer. Examples of the nonaqueous solvent that can be used include: cyclic carbonates such as ethylene carbonate, propylene carbonate, and butylene carbonate; chain carbonates such as dimethyl carbonate, ethyl methyl carbonate, and diethyl carbonate; and solvent mixtures of cyclic and chain carbonates. Examples of the electrolyte salt include $LiPF_6$, $LiBF_4$, and $LiCF_3SO_3$.

The covering member 18 is, for example, a strip-shaped film wound around the outer circumference surface of the electrode assembly 15 and is thereby disposed on the outer circumference surface of the electrode assembly 15. Alternatively, the covering member 18 is a bag-shaped film containing the electrode assembly 15 and is thereby disposed on the outer circumference surface of the electrode assembly 15. An adhesive may be interposed between the covering member 18 and the electrode assembly 15. The specific structure of the covering member 18 will be described later.

The nonaqueous electrolyte secondary battery 10 includes a negative electrode terminal 16 and a positive electrode terminal 17 that are attached to the lid plate 14. To collect a current, the negative electrode terminal 16 is electrically connected to a negative electrode tab (not shown) extending from the negative electrode current collector included in the electrode assembly 15. To collect a current, the positive electrode terminal 17 is electrically connected to a positive electrode tab (not shown) extending from the positive electrode current collector included in the electrode assembly 15.

The case body 13 used is a box with a closed bottom and formed of a metal material such as iron, an iron-based alloy, e.g., stainless steel, aluminum, or an aluminum-based alloy. For example, the lid plate 14 is formed of the same material as the material of the case body 13.

Figure 3:
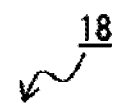
FIG. 3 is a partial cross-sectional view of a covering member used in the present embodiment.
Figure 3:
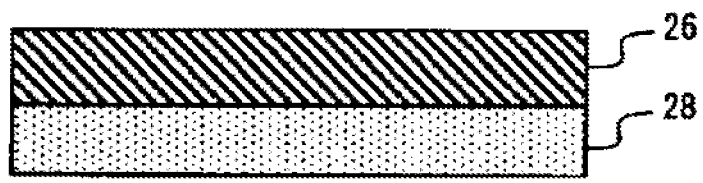

FIG. 3 is a partial cross-sectional view of the covering member 18 used in the present embodiment. The covering member 18 includes a stretchable resin layer 26 and a heat absorbing layer 28 containing a heat absorbing material.

The stretchable resin layer 26 is a resin sheet that is stretchable when subjected to stress, and the maximum elongation (fracture elongation) of the resin layer 26 when it is stretched in its lengthwise direction is, for example, preferably 500% or more. The stretchable resin layer 26 is formed of, for example, a polyurethane-based elastomer, a polyester-based elastomer, a polystyrene-based elastomer, a polyolefin-based elastomer, or a polyamide-based elastomer. Of these, a highly stretchable polyurethane-based elastomer is preferable. Examples of the polyurethane-based elastomer include polyurethanes and polyurethane-polyurea elastomers, and polyurethanes are preferable in terms of their stretchability etc. The resin layer 26 can have any thickness, but the thickness is preferably in the range of, for example, 20 μm to 200 μm.

The heat absorbing layer 28 containing the heat absorbing material is formed, for example, by applying a slurry containing heat absorbing material particles dispersed in a dispersion medium to the resin layer 26. No particular limitation is imposed on the composition, content etc. of the heat absorbing material so long as it can absorb or consume heat. Preferably, the temperatures at which the heat absorbing material absorbs or consumes heat are equal to or higher than the normal operating temperature of the nonaqueous electrolyte secondary battery. Specifically, since the normal operating temperature of the nonaqueous electrolyte secondary battery is at most about 90° C., the temperatures at which the heat absorbing material absorbs or consumes heat are more preferably, for example, 100° C. or higher. The heat absorbing layer 28 can have any thickness, but the thickness is preferably in the range of, for example 2 μm to 20 μm.

Examples of the heat absorbing material include antimony-containing compounds, metal hydroxides, sodium salt hydrates, guanidino-based compounds, boron-containing compounds, and zinc tartrate. Examples of the antimony-containing compounds include antimony trioxide, antimony tetroxide, and antimony pentoxide. Examples of the metal hydroxides include aluminum hydroxide and magnesium hydroxide. Examples of the sodium salt hydrates include sodium sulfate decahydrate and sodium carbonate decahydrate. Examples of the guanidino-based compounds include guanidine, nitrate, guanidino sulfamate, guanidine phosphate, and guanidyl urea phosphate. Examples of the boron-containing compounds include $H_3BO_3$ and $HBO_2$. Examples of the zinc tartrate compounds include $Zn_2SnC_4$, $ZnSnO_3$, and $ZnSn(OH)_6$. Of these, aluminum hydroxide, sodium sulfate decahydrate, or a mixture thereof is preferable in terms of, for example, the absorbable amount, of heat generated in the nonaqueous electrolyte secondary battery 10.

Aluminum hydroxide undergoes the following endothermic reaction at 200° C. or higher.

Sodium sulfate decahydrate undergoes the following endothermic reaction at 100° C. or higher.

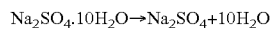

Examples of the dispersion medium include polymer binders. Examples of the polymer binders include polyvinylidene fluoride, polymethyl methacrylate, polyacrylonitrile, and polyethylene glycol.

Figure 4:
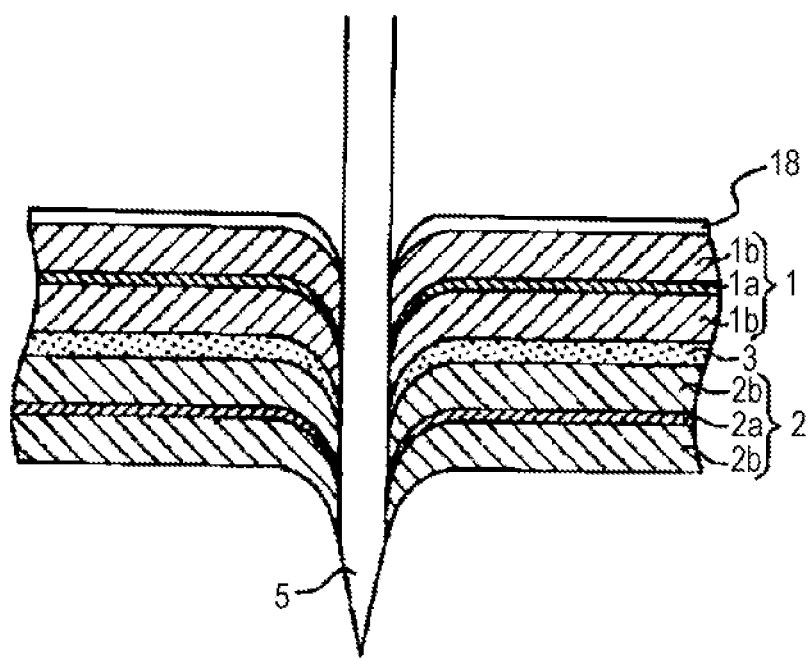
FIG. 4 is a partial enlarged cross-sectional view showing an electrode assembly when the electrode assembly is penetrated with a nail.

FIG. 4 is a partial enlarged cross-sectional view showing an electrode assembly penetrated with a nail. Generally, when a nonaqueous electrolyte secondary battery is penetrated with a nail, for example, a nail 5 penetrates, a positive electrode 1 and a separator 3 and reaches a negative electrode 2. In this case, a positive electrode current collector 1a and a positive electrode active material layer 1b are in direct contact with the nail 5, and a negative electrode current collector 2a and a negative electrode active material layer 2b are also in direct contact with the nail 5. An internal short, circuit thereby occurs between the positive electrode current collector 1a and the negative electrode current collector 2a through the nail 5, and a short circuit current flows, so that the nonaqueous electrolyte secondary battery is heated to its normal operating temperature or higher. However, in the present embodiment, even when the nail 5 penetrates the electrode assembly, the covering member 18 disposed on the outer circumferential surface of the electrode assembly stretches along the nail 5, and therefore the resin layer of the covering member 18 is interposed between the nail 5 and the positive electrode current collector 1a and between the nail 5 and the negative electrode current collector 2a. In this case, the resistance between the positive electrode current collector 1a and the negative electrode current collector 2a through the nail 5 is high, and a large short circuit current does not flow, so the amount of heat generated in the battery can be low. Moreover, the heat absorbing layer of the covering member 18 absorbs and consumes the heat generated by the internal short circuit in the battery, and therefore the heat generation of the battery can be more effectively reduced.

By using the covering member in the present embodiment, the following secondary effects may be obtained. (1) When a plurality of nonaqueous electrolyte secondary batteries are used to form a module, the heat generation reduction effect of each nonaqueous electrolyte secondary battery can reduce its thermal influence on adjacent nonaqueous electrolyte secondary batteries. (2) The covering member fixes the electrode assembly, and therefore motion of the electrode assembly within the case caused by an impact or vibrations applied to the battery can be prevented. In addition, when a force generated by expansion of the electrode assembly during charge/discharge or actual use (during charge/discharge cycles of the battery or storage) increases (this force is hereinafter referred to as a reaction force), the covering member can absorb the reaction force. (3) Since the covering member is disposed only on the outer circumferential surface of the electrode assembly, the thickness of the nonaqueous electrolyte secondary battery can be smaller than that when the covering member is disposed on each electrode and each separator, so that the reduction in the energy density of the battery is small.

In the covering member 18 shown in FIG. 3, its surface in contact with the electrode assembly may be the resin layer 26 or may be the heat absorbing layer 28. Specifically, the covering member 18 may be disposed such that the resin layer 26 and the heat absorbing layer 28 are disposed in this order on the outer circumferential surface of the electrode assembly or such that the heat absorbing layer 28 and the resin layer 26 are disposed in this order on the outer circumferential surface. When the heat-generating electrode assembly is in contact with the heat absorbing layer 23, the heat generated by the electrode assembly transfers efficiently to the heat absorbing material of the heat absorbing layer 28 and is absorbed thereby, and the resistance between the positive electrode 1 and the negative electrode 2 through the nail 5 can be effectively increased. From these and other points of view, it is preferable that the heat absorbing layer 28/the resin layer 26 are disposed in this order on the outer circumferential surface of the electrode assembly (it is preferable that the resin layer 26 serves as the outermost layer of the covering member 18).

The covering member 18 shown in FIG. 3 has a two-layer structure including the resin layer 26 and the heat absorbing layer 28. In the present embodiment, an additional layer may be included in addition to these layers. Other embodiments of the covering member 18 will next be described.

Figure 5A:
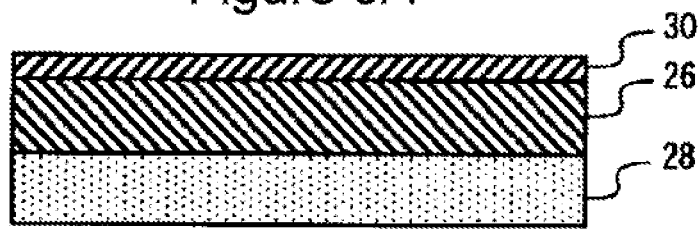
FIG. 5A is a partial cross-sectional view of a covering member according to another embodiment.
Figure 5B:
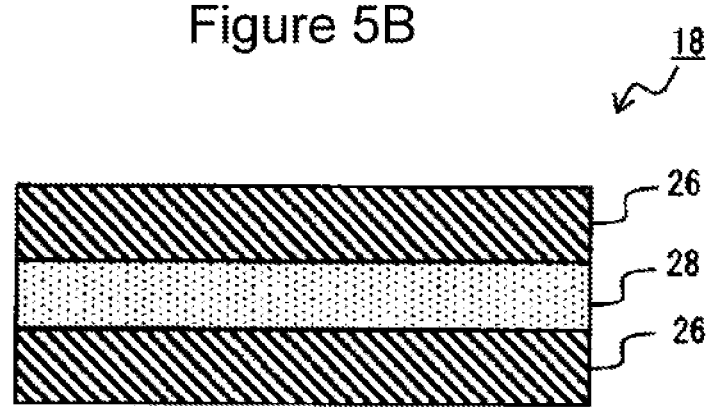
FIG. 5B is a partial cross-sectional view of a covering member according to still another embodiment.
Figure 5C:
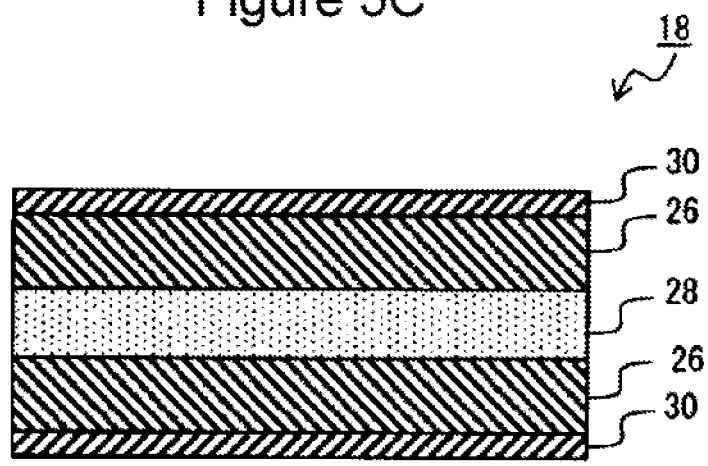
FIG. 5C is a partial cross-sectional view of a covering member according to yet another embodiment.

FIGS. 5A to 5C are partial cross-sectional views of covering members in other embodiments. In the covering members shown in FIGS. 5A to 5C, components similar to those in the covering member shown in FIG. 3 are denoted by the same numerals. In the covering member 18 shown in FIG. 5A, a heat absorbing layer 28/a resin layer 26/a base layer 30 are stacked in this order. In the covering member 18 shown in FIG. 5B, a resin layer 26/a heat absorbing layer 28/a resin layer 26 are stacked in this order. In the covering member 18 shown in FIG. 5C, a base layer 30/a resin layer 26/a heat absorbing layer 28/a resin layer 26/a base layer 30 are stacked in this order.

The base layers 30 included in the covering members 18 in FIGS. 5A and 5C are layers composed mainly of, for example, an organic material, and specific examples of the organic material include PE (polyethylene), PPS (polyphenylene sulfide), PEEK (polyether ether ketone), PI (polyimide), PP (polypropylene), PET (polyethylene terephthalate), and PBT (polybutylene terephthalate). By disposing a base layers 30, the strength of a covering member 18 can be improved. The base layer 30 can have any thickness, but the thickness is preferably in the range of, for example, 20 µm to 100 µm.

In the structures of the covering members 18 in FIGS. 5B and 5C, the heat absorbing layer 28 is sandwiched between resin layers 26. This can prevent a side reaction caused by contact between the heat absorbing material and the electrolyte.

In a covering member 18 including a base layer 30, it is preferable that the base layer 30 serves as the outermost layer of the covering member 18, Specifically, in the covering member 18 shown in FIG. 5A, it is preferable that the heat absorbing layer 28/the resin layer 26/the base layer 30 are disposed in this order on the outer circumferential surface of the electrode assembly. In this case, deterioration of the resin layer 26 caused by contact between the resin layer 26 and the electrolyte can be prevented, and a side reaction caused by contact between the heat absorbing material and the electrolyte can be prevented.

Figure 6:
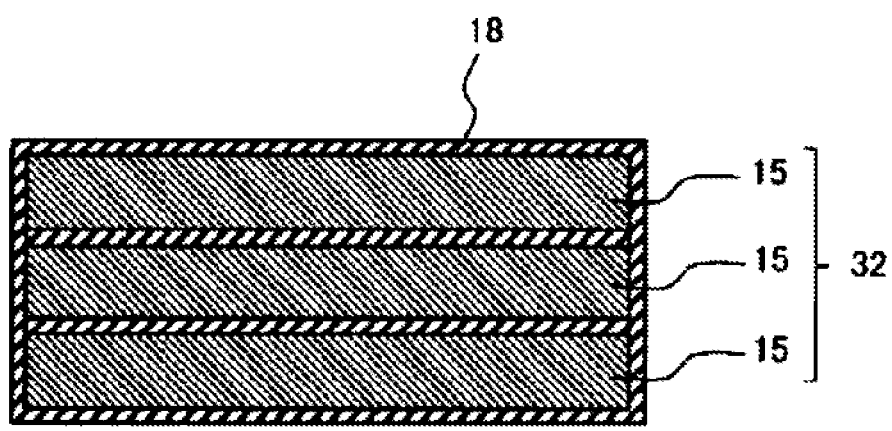
FIG. 6 is a cross-sectional view of an electrode assembly stack and a covering member.

When the nonaqueous electrolyte secondary battery includes an electrode assembly stack 32 including a plurality of stacked electrode assemblies 15, it is preferable that the covering member 18 is disposed on the outer circumferential surface of the electrode assembly stack 32 and disposed also between the electrode assemblies 15 included in the electrode assembly stack 32, as shown in FIG. 6.

The form of the nonaqueous electrolyte secondary battery is not limited to the rectangular type, and examples of the form of the nonaqueous electrolyte secondary battery include a laminate type, a cylindrical type, the rectangular type, a coin type, and a button type.

EXAMPLES

The embodiments will next be described in more detail by way of Examples. However, the embodiments are not limited to these Examples.

Experimental Example 1

(Production of Battery Cell)

A positive electrode mixture slurry containing $LiNi_{0.35}Mn_{0.35}CO_{0.3}O_2$ used as the positive electrode active material was applied to both sides of aluminum foils (thickness: 15 µm), dried, and then rolled to produce positive electrodes each having a shape including a positive electrode tab protruding from a portion coated with the positive electrode mixture. Next, a negative electrode mixture slurry containing graphite used as the negative electrode active material was applied to both sides of copper foils (thickness: 10 μm), dried, and then rolled to produce negative electrodes each having a shape including a negative electrode tab protruding from a portion coated with the negative electrode mixture. Next, the positive electrodes and the negative electrodes were stacked alternately with a separator therebetween to thereby produce a stack-type electrode assembly.

Next, a film including a base layer (thickness: 70 μm)/a stretchable resin layer (thickness: 100 μm)/a heat absorbing layer (thickness: 10 μm)/a stretchable resin layer (thickness: 100 μm)/a base layer (thickness: 70 μm) stacked in this order was wound around the outer circumferential surface of the electrode assembly. Each stretchable resin layer used was a polyurethane film (elongation: 300% or more). The heat absorbing layer was formed by applying, to a polyurethane film, a slurry prepared by dispersing aluminum hydroxide used as the heat absorbing material in polyvinylidene fluoride. The base layers are formed by heat-sealing the resin layers with polyurethane from the sides opposite to the heat absorbing layer.

$LiPF_6$ was dissolved at 1M (mol/L) in a solvent mixture prepared by mixing ethylene carbonate (EC), propylene carbonate (PC), and diethyl carbonate (DEC) at a volume ratio of 25:5:75, and the resulting mixture was used as the electrolyte.

The positive electrode tabs of the produced electrode assembly were attached to a positive electrode terminal plate connected to a positive electrode terminal attached to a lid, and the negative electrode tabs were attached to a negative electrode terminal plate connected to a negative electrode terminal attached to the lid. Next, the electrode assembly was inserted into a case body from its opening, and the opening was covered with the lid. The circumferential edge of the opening of the case and the circumferential edge of the lid were laser-welded together. Next, the electrolyte was poured from a liquid inlet formed in the lid, and the liquid inlet was sealed to thereby produce a rectangular battery cell.

Example 2

A battery cell was produced in the same manner as in Example 1 except that the heat absorbing material was changed from aluminum hydroxide to sodium sulfate decahydrate.

Comparative Example 1

A battery cell was produced in the same manner as in Example 1 except that the covering member was not used.

Comparative Example 2

A battery cell was produced in the same manner as in Example 1 except that a film prepared by stacking a base layer (thickness: 70 μm)/a stretchable resin layer (thickness: 100 μm) in this order was used as the covering member.

(Nail Penetration Test)

Each of the battery cells in the Examples and Comparative Examples was charged at a constant charging current of 80 A until 4.2 V. Next, the battery cell was charged at a constant voltage of 4.2 V until the charging current reached 4 A. The charged battery cell was held from both sides between a pair of SUS plates to fix the battery cell. A thermocouple was placed near the center of a surface of the battery cell. Then, using a nail penetration tester, the center of the battery cell used as a nail penetration point was penetrated with a nail with ϕ6 mm at a speed of 25 mm/sec. The maximum temperature of the battery cell penetrated with the nail was measured by the thermocouple placed near the center of the surface of the battery cell.

The maximum temperature of the battery cell penetrated with the nail in Example 1 was 320° C., and the maximum temperature of the battery cell in Example 2 was 313° C. The maximum temperature of the battery cell in Comparative Example 1 was 391° C., and the maximum temperature of the battery cell in Comparative Example 2 was 342° C. As can be seen from the above results, by disposing the covering member including the stretchable resin layers and the heat absorbing layer on the outer circumferential surface of the electrode assembly, the heat generation of the battery penetrated with the nail can be reduced.

REFERENCE SIGNS LIST 1 positive electrode
1a positive electrode current collector
1b positive electrode active material layer
2 negative electrode
2a negative electrode current collector
2b negative electrode active material layer
3 separator
5 nail
10 nonaqueous electrolyte secondary battery
12 case
13 case body
14 lid plate
15 electrode assembly
16 negative electrode terminal
17 positive electrode terminal
18 covering member
26 resin layer
28 heat absorbing layer
30 base layer
32 electrode assembly stack

The invention claimed is:

1. A nonaqueous electrolyte secondary battery comprising:
an electrode assembly consisting of a separator and positive and negative electrodes stacked through the separator;
a covering member directly contacting an outer circumferential surface of the electrode assembly;
a nonaqueous electrolyte; and
a case sealing the electrode assembly, the covering member, and the nonaqueous electrolyte,
wherein the covering member has a multilayer structure including a stretchable resin layer and a heat absorbing layer containing a heat absorbing material.

2. The nonaqueous electrolyte secondary battery according to claim 1, wherein the covering member includes the stretchable resin layer/the heat absorbing layer containing the heat absorbing material/another stretchable resin layer that are stacked in this order.

3. The nonaqueous electrolyte secondary battery according to claim 1, wherein the resin layer is formed of polyurethane.

4. The nonaqueous electrolyte secondary battery according to claim 1, wherein the heat absorbing material is aluminum hydroxide ($Al(OH)_3$), sodium sulfate decahydrate ($Na_2SO_4 \cdot 10H_2O$), or a mixture thereof.

5. The nonaqueous electrolyte secondary battery according to claim 1, comprising an electrode assembly stack including a plurality of the electrode assemblies stacked one on top of another,
wherein the covering member is disposed on an outer circumferential surface of the electrode assembly stack and between the electrode assemblies forming the electrode assembly stack.

6. The nonaqueous electrolyte secondary battery according to claim 1, wherein the nonaqueous electrolyte is interposed at least between the covering member and the case.

7. The nonaqueous electrolyte secondary battery according to claim 1, wherein the covering member includes the heat absorbing layer, the stretchable resin layer and a base layer stacked in this order,
the base layer including an organic material selected from a group consisting of PE (polyethylene), PPS (polyphenylene sulfide), PEEK (polyether ether ketone), PI (polyimide), PP (polypropylene), PET (polyethylene terephthalate), and PBT (polybutylene terephthalate).

8. The nonaqueous electrolyte secondary battery according to claim 1, wherein the covering member includes a base layer, the stretchable resin layer, the heat absorbing layer, another stretchable resin layer and another base layer stacked in this order,
wherein the base layer and the another base layer each include an organic material selected from a group consisting of PE (polyethylene), PPS (polyphenylene sulfide), PEEK (polyether ether ketone), PI (polyimide), PP (polypropylene), PET (polyethylene terephthalate), and PBT (polybutylene terephthalate).

9. The nonaqueous electrolyte secondary battery according to claim 1,
wherein the covering member is wound around the electrode assembly.

10. The nonaqueous electrolyte secondary battery according to claim 1,
wherein the covering member includes a base layer stacked with the heat absorbing layer and the stretchable resin layer,
wherein the stretchable resin layer is farther from the electrode assembly than the heat absorbing layer, and
wherein the base layer is farther from the electrode assembly than the stretchable resin layer.

11. A nonaqueous electrolyte secondary battery comprising:
an electrode assembly consisting of a separator and positive and negative electrodes stacked through the separator;
a covering member disposed on an outer circumferential surface of the electrode assembly;
a nonaqueous electrolyte;
a case sealing the electrode assembly, the covering member, and a nonaqueous electrolyte; and
an adhesive disposed between the covering member and the electrode assembly,
wherein the covering member has a multilayer structure including a stretchable resin layer and a heat absorbing layer containing a heat absorbing material, and
wherein the adhesive directly contacts the electrode assembly and the covering member.

12. The nonaqueous electrolyte secondary battery according to claim 11,
wherein the covering member is wound around the electrode assembly.

13. The nonaqueous electrolyte secondary battery according to claim 11,
wherein the covering member includes a base layer stacked with the heat absorbing layer and the stretchable resin layer,
wherein the stretchable resin layer is farther from the electrode assembly than the heat absorbing layer, and
wherein the base layer is farther from the electrode assembly than the stretchable resin layer.

* * * * *